United States Patent [19]

Komatsu et al.

[11] Patent Number: 5,268,206
[45] Date of Patent: Dec. 7, 1993

[54] MAGNETIC RECORDING MEDIUM MANUFACTURING METHOD

[75] Inventors: Kazunori Komatsu; Mikio Tomaru, both of Kanagawa, Japan

[73] Assignee: Fuji Photo Film Co., Ltd., Kanagawa, Japan

[21] Appl. No.: 933,658

[22] Filed: Aug. 24, 1992

[30] Foreign Application Priority Data

Aug. 23, 1991 [JP] Japan .................. 3-235686
Aug. 29, 1991 [JP] Japan .................. 3-242440
Oct. 15, 1991 [JP] Japan .................. 3-293882

[51] Int. Cl.$^5$ ............................. B05D 5/12
[52] U.S. Cl. ................... 427/548; 427/130; 427/131; 427/132; 427/550; 427/599
[58] Field of Search ............. 427/548, 130, 131, 132, 427/550, 599

[56] References Cited

U.S. PATENT DOCUMENTS 4,863,793  9/1989  Ogawa et al. .................. 428/323
4,874,633 10/1989  Komatsu et al. ............. 428/694 X

*Primary Examiner*—Bernard Pianalto
*Attorney, Agent, or Firm*—Sughrue, Mion, Zinn, Macpeak & Seas

[57] ABSTRACT

The present invention forms non-magnetic particles in a acicular shape as dispersed in a dispersoid liquid, forms a lower non-magnetic layer by coating the above-mentioned dispersoid liquid on a continually transported non-magnetic supporting base, forms an upper magnetic layer by coating the above-mentioned magnetic coating liquid in dual layers either consecutively or at the same time while the lower layer is still in its wet state, and performs an orientation of the magnetic particles by exposing the particles to a magnetic field while the dual layers as thus formed are still in their undried state. The orientation effect is achieved by making the specific gravity of the non-magnetic particles equal to or greater than that of the magnetic particles. The orientation effect is further enhanced by making the particle size of the non-magnetic particles equal to or less than that of the magnetic particles as measured along the long axis of the magnetic particles.

7 Claims, 1 Drawing Sheet

MAGNETIC RECORDING MEDIUM MANUFACTURING METHOD

BACKGROUND OF THE INVENTION

The present invention relates to the manufacture of magnetic recording media. More particularly, the present invention relates to a method for manufacturing a magnetic recording medium having a very thin magnetic layer not exceeding 1.0 μm in thickness as measured in a dry state. The present invention provides a method for manufacturing a magnetic recording medium having very excellent orientation of magnetic particles and very favorable electromagnetic conversion characteristics.

It is conventional to manufacture magnetic recording media, such as video tapes, audio tapes, and the like, by applying a coating liquid containing particles of a ferromagnetic material dispersed in a bonding agent dissolved in an organic solvent on a non-magnetic supporting base (web). The supporting base has a belt shape and is continually transported in the longitudinal direction thereof. After applying the coating liquid, the coating liquid is dried and solidified. Thereafter, the supporting base is cut to produce the magnetic recording medium.

However, it is necessary in the production of magnetic recording media to increase the rectangular ratio (i.e., the value obtained by dividing the residual flux density $B_r$ by the saturated or maximum flux density $B_s$) of the magnetic coating, with the magnetic particles being oriented in the transport direction of the non-magnetic supporting base. By increasing the rectangular ratio, the magnetic sensitivity of the magnetic media is increased and the signal-to-noise (S/N) ratio achieved on the media can be improved. For this reason, it has been known to apply a process of arranging (orienting) the direction of the axis of easy magnetization of the magnetic particles towards the transport direction of the non-magnetic supporting base by exposing the base to a magnetic field in the transport direction by means of a permanent magnet or a solenoid coil or the like while the coated liquid is still wet.

In recent years, there has been a strong demand for an increase in the storage capacity of recording media. In order to attain an increase in capacity, the information recording density per unit area on each recording medium must be increased. At the same time, it is necessary to reduce the area in which a writing signal is concentrated in the form of magnetic flux generated by a magnetic head. As a result, the size of the magnetic head and also the amount of magnetic flux generated must be reduced. In addition, the volume of the magnetic recording layer which can be processed for a reversal of magnetization must be reduced so that it will not be possible to make any complete reversal of magnetization unless the thickness of the magnetic recording layer is reduced.

Thus, in order to increase the recording density of a recording medium, it has become necessary to form a magnetic recording layer with a thinner layer to achieve an increase in storage capacity.

However, in the case of a thin layer magnetic coating with a dry layer thickness not exceeding 2 μm, the surface area of the magnetic particles is large compared with the amount (volume) of the magnetic coating liquid. Thus, the ratio of decrease due to the evaporation of the solvent in the magnetic coating liquid is increased and the viscosity of the coating increased accordingly.

As the evaporation occurs before a magnetic field is applied to properly orientate the magnetic particles in the medium, it is more difficult for the magnetic particles to move into the proper alignment. Thus, it has been found that the rectangular ratio will not be improved to any significant extent even if the above-mentioned magnetic field is used to orient the magnetic particles. Furthermore, in dual-layer coating process in which an upper magnetic layer is coated on the lower layer previously dried, it has been noted that the magnetic particles of the upper layer will have still greater difficulty in their movement due to an increase in the viscosity of the coating liquid. This increase is brought about by the absorption of the solvent of the magnetic coating liquid into the lower layer of the magnetic recording medium.

A method of overcoming the above problems has been proposed in Japanese Laid-Open Patent Applicant No. Sho. 62- 92132. This disclosure describes a method for manufacturing a magnetic recording medium that includes the steps of providing both a thin magnetic layer and a non-magnetic undercoat layer at the same time using a simultaneous dual-layer coating process and applying a magnetic field to both of the layers while they are still in their undried states.

Nevertheless, the combination of the thin magnetic layer and the lower non-magnetic layer as proposed above does not produce any notable improvement on the rectangular ratio even if a magnetic field is applied to the two layers.

SUMMARY OF THE INVENTION

Accordingly, an object of the present invention is to overcome the above problems, and to provide magnetic recording medium manufacturing method which is capable of achieving a favorable orientation of magnetic particles in a very thin magnetic layer in a dry layer thickness of 1.0 μm or less and thereby producing a magnetic recording medium with very excellent electromagnetic conversion characteristics, such as RF output and S/N ratio.

In an effort to overcome the problems, it has been discovered by the inventors that the shape of the non-magnetic particles in the above-mentioned non-magnetic undercoat layer influences the orientation of magnetic particles during the manufacturing process. More specifically, as the shape of the non-magnetic particles becomes more and more spherical, the magnetic particles in the thin magnetic layer tend to fall into a very unstable state under the influence of the shape of the non-magnetic particles in the lower non-magnetic layer. This tendency is exhibited before, after, and during application of the magnetic field at a time when the two layers are still in their undried dual-layer coating states. As a result, the orientation of the magnetic particles in the thin magnetic layer is disturbed. It has also been found that this disturbance in the orientation of the magnetic particles will become more considerable as the thickness of the thin magnetic layer is reduced.

Moreover, the invention have discovered that it is possible to attain a favorable orientation of the magnetic particles by forming the non-magnetic particles of the lower non-magnetic layer into an acicular shape. Preferably, the acicular ratio of the non-magnetic particles is not less than eight. As a result, when the magnetic particles are exposed to a magnetic field while the thin magnetic layer is in an undried state, and when the lower non-magnetic layer is still in a wet state, a favorable orientation can be attained, thereby increasing the rectangular ratio.

More specifically, the objects of the present invention can be attained by a magnetic recording medium manufacturing method comprising the steps of: forming a non-magnetic undercoat layer by applying a dispersoid liquid containing acicular, non-magnetic particles over a non-magnetic supporting base and applying a magnetic coating liquid containing magnetic particles on the lower non-magnetic layer, thereby forming a magnetic layer in a dry layer thickness of 1.0 μm or less while the lower non-magnetic layer is still is a wet state. The magnetic recording medium manufacturing method is characterized in that the acicular particles of the non-magnetic layer promote the orientation of the magnetic particles while the two layers are exposed to a magnetic field at the same time.

In this regard, powder of inorganic compounds, such as metallic oxide, metallic carbonate, metallic sulfate, metallic nitride, metallic carbide, metallic sulfide, and the like, can be used as the non-magnetic particles in accordance with the present invention. Preferably, α-iron oxide, titanium oxide, aluminum oxide, cerium oxide, tin oxide, tungsten oxide, zinc oxide, zirconium oxide, copper oxide, tungsten carbide, silver oxide, and the like are used either individually or in combination.

The non-magnetic powder used in the present invention should have the following characteristics: The moisture content ratio of the powder should be in the range of 0.1 to 5% and preferably in the range of 0.2 to 3%. Its pH should be in the range of 2 to 11. Its crystal size should preferably be in the range of 0.01 to 2 μm, and its acicular ratio should preferably be 8 or more. The non-magnetic powder needs not necessarily be 100% pure, but may have its surface treated with another compound as appropriate for a given purpose. In such a surface treatment, the effect of the non-magnetic powder will not be reduced provided that its purity remains not less than 70%. For example, where titanium oxide is to be used, the surface may be treated with alumina in a manner well known to the art. The loss on ignition for the non-magnetic powder should preferably be within 20%.

The non-magnetic powder is to be used in the range of 20 to 0.1% in weight ratio and in the range of 10 to 0.2 in volumetric ratio, respectively, with respect to the bonding agent. Japanese Patent Applications Nos. Sho. 59-142741, Sho. 61-214127, and Sho. 63-140420 disclose that the undercoat layer should contain $SnO_2$. These applications further disclose that iron oxide or BaFe is used in the upper magnetic layer. Although iron oxide or BaFe is smaller in specific gravity that $SnO_2$, each of these references teaches an undercoat treatment wherein the thickness of the undercoat layer is much thinner than the upper magnetic layer.

The magnetic particles used in the upper magnetic layer of the present invention may be, for example, fine powders of ferromagnetic alloys containing $\gamma$-$FeO_x$ (wherein, x=1.33 to 1.5), Co-denatured $\gamma$-$FeO_x$ (where x=1.33 to 1.5), Fe or Ni or Co as the principal component and such well-known ferromagnetic powders as barium ferrite and strontium ferrite. These ferromagnetic alloys may include any such atoms as Al, Si, S, Sc, Ti, V, Cr, Cu, Y, Mo, Rh, Pd, Ag, Sn, Sb, Te, Ba, Ta, W, Re, Au, Ng, Pb, Bi, La, Ce, Pr, Nd, P, Co, Mn, Zn, Ni, Sr, and B in addition to the predetermined atoms. These ferromagnetic fine powders may be given a preliminary treatment, in advances of dispersion, with such dispersants, lubricants, surface active agents, antistatic agents, and so forth as will be described below. Teachings in this regard are shown in, for example, Japanese Patent Applications Nos. Sho. 44-14050, Sho. 45-18372, Sho. 47-22062, Sho. 47-22513, Sho. 46-28466, Sho. 46-38755, Sho. 47-4286, Sho. 47-12422, Sho. 47-17284, Sho. 47-18509, Sho. 47-18573, Sho. 39-10307, Sho. 48-39639, as well as in U.S. Pat. Nos. 3,026,215, 3,031,341, 3,100,194, 3,242,005, and 3,389,014.

Among the ferromagnetic powder mentioned above, the ferromagnetic alloy fine powder may contain a small amount of hydroxide or oxide. Those ferromagnetic alloy fine powder which are obtained by well-known manufacturing processes can be used, the following processes are illustrative: a process for reduction with a reducing gas composed of composite organic complex salt (mainly oxalate) and hydrogen, a process for obtaining Fe or Fe-Co particles by reducing iron oxide with a reducing gas such as hydrogen, a process for applying thermal decomposition to metallic carbonyl compound, a process for reduction with the addition of any such reducing agents as sodium borohydride, hypophosphite, or hydrazine to an aqueous solution of a ferromagnetic metal, a process for obtaining fine powder by vaporizing a metal in an inert gas under a low pressure.

The ferromagnetic alloy powder which is obtained can be processed by any known gradual oxidizing treatment, for example, a treatment including steps of dipping the powder in an organic solvent and thereafter drying it, a process including steps of dipping the powder in an organic solvent, then forming an oxidized film on the surface of the powder with oxygen-containing gas, and thereafter drying the powder, or a process including steps of forming an oxidized film on the surface of the powder, not using any organic solvent but regulating the partial pressure of a hydrogen gas and an inert gas.

The ferromagnetic powder used in the present invention in the upper magnetic layer is in the range of 25 to 30 $m^2/g$ and preferably in the range of 35 to 60 $m^2/g$ as expressed in terms of the specific surface area by the BET method. With a specific surface area less than 25 $m^2$, noises will be generated at a high levels; however, a specific surface area in excess of 80 $m^2/g$ is not desirable because it causes difficulty in achieving any proper surface characteristics. The crystallite size of the ferromagnetic powder for the upper magnetic layer according to the present invention is in the range of 450 to 100 Å and should preferably be in the range of 350 to 150 Å. The $\sigma_s$ of the iron oxide magnetic powder is at least 50 emu/g and should preferably be not less than 70 emu/g. The $\sigma_s$ for the ferromagnetic metal fine powder should preferably be at least 100 emu/g.

The percentage of the amount of magnetization left over without reversal when a magnetic field at 1500 Oe is applied in the opposite direction after a magnetic recording medium is saturated in its magnetization (hereinafter referred to as "R1500") of the ferromagnetic powder should preferably be 1.5 or less. It is more preferably that the r1500 of the powder be 1.0 or less.

It is desirable that the moisture content of the ferromagnetic powder remains in the range of 0.01 to 2%. Depending on the type of the bonding agent, it is desirable to optimize the moisture content of the ferromagnetic powder. The tap density of the $\gamma$-iron oxide should preferably be 0.5 g/cc or more and should more preferably be at least 0.8 g/cc.

In case γ-iron oxide is used, the ratio of bivalent iron to trivalent iron should preferably be in the range of 0 to 20%, and it should more preferably be in the range of 5 to 10%. Moreover, the atomic weight of cobalt atoms in ratio to iron atoms should be in the range of 0 to 15% and should preferably be in the range of 2 to 8%.

It is desirable that the pH value of the ferromagnetic powder should be optimized for its combination with the bonding agent to be used. The range of its pH value is from 4 to 12 and preferably from 6 to 10. The ferromagnetic powder may be given a surface treatment with Al, Si, P, or an oxide of any of these as necessary in each case. The quantity of such a surface treatment agent is in the range of 0.1 to 10% in its ratio to the ferromagnetic powder. Such a surface treatment is desirable because it achieves a reduction in the adsorption of the lubricant, such as fatty acid, to 100 mg/m$^2$ or less. The ferromagnetic powder contains inorganic ions of soluble Na, Ca, Fe, Ni, Sr, and the like, in some instances, but such inorganic ions do not influence any particular characteristic of the ferromagnetic powder so long as the ions remain in a ratio not exceeding 500 ppm.

Moreover, it is desirable to minimize the number of holes in the ferromagnetic powder. The value of the ratio of the holes in the ferromagnetic powder should be 20 percent by volume or less, more preferably 5 percent or less by volume. Additionally, the shape of the particle in the powder may be any of an acicular, a grainy, a rice grainy, or a planar form, so long as the particle satisfies the characteristics required of the particle size indicated above. In order to attain Switch Field Distribution (SFD) 0.6 or less in the ferromagnetic powder, it will be necessary to reduce the distribution of Hc in the ferromagnetic powder. For this purpose, the available feasible methods include such processes as improving the particle size distribution of gehtite, preventing the sintering of γ-hematite, and reducing the adhering rate of cobalt so as to be slower than that of previous practice for treating the iron oxide with denatured cobalt.

For the present invention, barium ferrite, strontium ferrite, and hexagonal system Co powder can be used as plate-shaped hexagonal system ferrite. In case barium ferrite is used, its particle size should be in the range of 0.001 to 1 μm in diameter in a thickness corresponding to ½ to 1/20 of the diameter. The specific gravity of the barium ferrite powder is 4 to 6 g/cc, and its specific area is in the range of 1 to 60 m$^2$/g.

In another aspect of the invention, it has been discovered that the specific gravity of the non-magnetic particles in the lower non-magnetic layer relative to the specific gravity of the magnetic particles in the thin magnetic layer influences the orientation of the magnetic particles during the manufacturing process. More specifically, as the specific gravity of the magnetic particles becomes larger than that of the non-magnetic particles, the particles in the two layers fall into an unstable state while the two layers are still in their undried states. This instability occurs despite the application of the magnetic field as discussed above. As a result, the orientation of the magnetic particles in the thin magnetic layer of the produced recording medium is disturbed.

In order to overcome the above problem, the inventors have discovered that it is possible to attain a favorable orientation of the magnetic particles mentioned above by making the specific gravity of the non-magnetic particles in the undercoat layer equal to or larger than the specific gravity of the magnetic particles in the thin magnetic layer. As a result, when the magnetic particles are exposed to a magnetic field while the two layers are in undried states, a favorable orientation can be attained, thereby increasing the rectangular ratio.

It should be noted that the powder of inorganic compounds described above can be used in accordance with the present invention to the extent that the powder has a specific gravity equal to or larger than the specific gravity of the magnetic particles which are used in the thin (upper) magnetic layer. In this regard, where Co denatured γ-iron oxide or barium ferrite in powder is to be used as the magnetic particles, it is to be noted that the specific gravity of γ-iron oxide is approximately 5, and that the specific gravity of barium ferrite is almost the same. Hence, any non-magnetic powder with a specific gravity not less than 5 can be used with the magnetic powder mentioned above.

For use as non-magnetic powder, it is desirable that the powder material has the features described above; however, at least the following additional features are preferable: tap density preferably in the range of 0.2 to 1.5 g/cc, and specific surface area in the range of 1 to 100 m$^2$/g, preferably in the range of 3 to 50 m$^2$g/, and more preferably in the range of 5 to 40 m$^2$/g. The crystal size should preferably be in the range of 0.01 to 2 μm. The amount of oil absorption recorded when DBP is used is in the range of 5 to 100 ml/100 g, and should preferably be in the range of 10 to 80 ml/100 g, and more preferably in the range of 20 to 60 ml/100 g. The shape of the non-magnetic powder particle may be any of an acicular, a spherical, or a cubic form.

In yet another aspect of the invention, it has been found that as the non-magnetic particles in the undercoat layer increase in particle size relative to the magnetic particles in the thin (upper) layer, the magnetic particles tend to fall into unstable states, thereby disturbing the orientation of particles on the recording medium after the application of the magnetic field to the two layers in their undried states.

In order to overcome the above problem, the inventors have discovered that it is possible to attain a favorable orientation of the magnetic particles by limiting the particles size of the non-magnetic particles in the undercoat layer to be not larger than the particle size of the magnetic particles in the thin magnetic layer as measured along the long axis of the magnetic particles. As a result, when the magnetic particles are exposed to a magnetic field while the two layers are in undried states, a favorable orientation can be attained, thereby increasing the rectangular ratio.

BRIEF DESCRIPTION OF THE DRAWING

The FIGURE illustrates an apparatus used to perform the preferred embodiment of the present invention.

DESCRIPTION OF THE PREFERRED EMBODIMENTS

Figure 1:
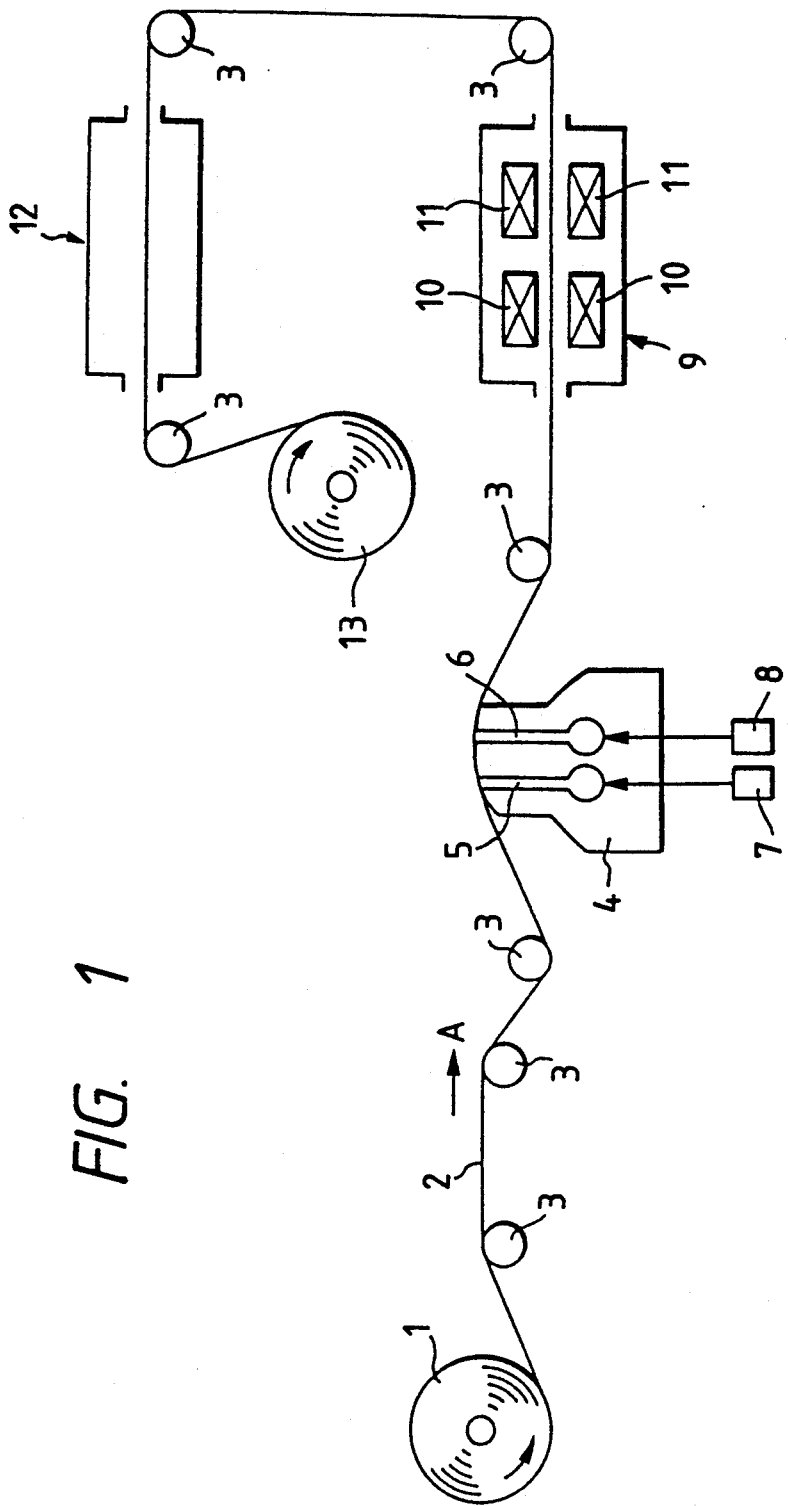

A magnetic recording medium manufacturing method according to the present invention will be described in detail below with reference to the accompanying drawings.

The FIGURE illustrates an apparatus that may be used for manufacturing the magnetic recording medium in accordance with one of embodiments of the present invention. A long belt-shaped non-magnetic supporting base (web) 2, which is wound around a feed roll 1, is continually unwound and transported in the arrow-marked direction A while it is supported with a pass roller 3, until the non-magnetic supporting base 2 is rewound up with a take-up roll 13. A simultaneous dual-layer coating device 4 is arranged in a position in the proximity of the surface of the non-magnetic supporting base 2 as transported in the manner described above, and both a dispersoid liquid containing non-magnetic particles and a magnetic coating liquid containing magnetic particles are supplied continually at a predetermined flow rate to this simultaneously dual-layer coating device 4 through each of liquid feeding systems 7 and 8 to form the lower non-magnetic layer and the magnetic layer, respectively. Then, each of liquids are respectively discharged from individual slots 5 and 6 of the simultaneously dual-layer coating device 4 onto the non-magnetic supporting base 2 and simultaneously coated with the duel layered arrangement. It should be noted, however, that one or more single layer coating devices may be utilized to produce the dual layers one at a time.

Moreover, non-magnetic particles formed in an acicular shape according to the present invention are dispersed in the dispersoid liquid for the above-mentioned non-magnetic undercoat layer.

In another aspect of the invention, the magnetic particles, and the non-magnetic particles respectively contained in the two coating liquids are combined and dispersed in such a manner that the specific gravity of the non-magnetic particles dispersed in the dispersoid liquid for the non-magnetic undercoat layer are equal to or larger than the specific gravity of the magnetic particles dispersed in the magnetic coating liquid.

In yet another aspect of the invention, the particles in the non-magnetic undercoat liquid and the particles in the magnetic liquid are combined and dispersed in such a manner that the particle size of the non-magnetic particles dispersed in the dispersoid liquid for the formation of the lower non-magnetic layer are equal to or less than the particle size taken along the long axis of the magnetic particles.

An orienting device 9 applies a magnetic field to the magnetic particles to arrange the orientation of the particles at the downstream of the coating device 4 in the direction arrow A. A drying device 12 is disposed at a farther downstream side int he same direction. The orienting device 9 is composed of an opposed dual-pole cobalt magnet 10 and a solenoid coil 11 which are used to orient the magnetic particles in the magnetic layer of the non-magnetic supporting base 2 towards the direction of transport of the non-magnetic supporting base 2, while the supporting base 2 is still in an undried state.

Next, the dual coating layers still being in wet condition will be dried and solidified on the non-magnetic supporting base 2 after the supporting base 2 passes through the drying device 12. A web of magnetic recording medium with dual layers including the magnetic particle layer will be obtained, and the magnetic recording medium thus obtained will be rewound up onto the wind-up roll 13 and then transported to the next work process, such as a calendering process, to be performed on the magnetic layer. Thereafter, a magnetic tape or the like can be formed by slitting the web of the magnetic recording medium.

Specifically, the orientation of the magnetic particles in the magnetic layer will not be disturbed because the magnetic particles will be in a well-stabilized state in the magnetic layer due to presence of the acicular non-magnetic particles. In another aspect of the invention, the orientation of the magnetic particles will not be disturbed because the specific gravity of the non-magnetic particles is larger than that of the magnetic particles. In yet another aspect of the invention, the magnetic particles are stabilized because the particle size of the non-magnetic particles are smaller than that of the magnetic particles as measured along the long axis of the magnetic particles.

In this regard, the bonding agents which are used in the non-magnetic undercoat layer and the magnetic layer include well-known thermoplastic resins, heat-cured resins, reactive-type resins, and their mixtures. The thermoplastic resins are those which have a glass transition temperature in the range of $-100°$ to $150°$ C., an average molecular weight in the range of 1,000 to 200,000 preferably in the range of 10,000 to 100,000, and a degree of polymerization in the range approximately from 50 to 1,000. Examples of such bonding agents are polymers or copolymers which include, as constituent units, vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, and so forth, as well as such polyurethane resin and various types of such rubber resins. Also, as the heat-cured resins or reactive-type resins, phenol resin, epoxy resin, polyurethane cured-type resin, uria resin, melamine resin, alkyd resin, acrylic system reactive resin, formaldehyde resin, silicone resin, epoxy polyamide resin, a mixture of polyester resin and isocyanate prepolymer, a mixture of polyester polyol and polyisocyanate, a mixture of polyurethane and polyisocyanate, and the like may be used.

Detailed descriptions of these resins are found in *Purasutikku Handobukku* (Plastics Handbook) published by Asakura Shoten. Also, it is possible to use well-known electron beam curable type resins in the lower non-magnetic layer or in the upper magnetic layer mentioned above. Examples of these reins as thus used and their manufacturing processes are described in detail in, for example, Japanese patent Application No. Sho. 256219. The resins mentioned above may be used either independently or in combination, and yet preferable resins for use are a combination of at least one type selected from the group consisting of vinyl chloride resin, resin composed of vinyl chloride and vinyl acetate, resin composed of vinyl chloride, vinyl acetate, and vinyl alcohol, and copolymer of vinyl chloride, vinyl acetate, and maleic anhydride with polyurethane resin, or a combination of polyisocyanate with these.

For the structure of polyurethane resin, it should be noted that such well-known combinations as polyester and polurethane, polyether and polyurethane, polyether and polyester and polyurethane, polycarbonate and polyurethane, polyester and polycarbonate and polyurethane, and polycaprolactone and polyurethane may be used. With regard to all the bonding agents listed herein, it is preferable to use those which are prepared by introducing thereinto, either by copolymerization or addition reaction, at least one polar group selected from COOM, $SO_3M$, $OSO_3M$, $P=O(OM)_2$, $P-PIO(CM)_2$ (with regard to these, M indicates a hydrogen atom or an alkali metal base), OH, $NR^2$, $N+R^3$ (wherein, R expresses hydrocarbon base), epoxy base, SH, CN, and the like. The quantity of such a polar base is in the range of $10^{-1}$ to $10^{-8}$ mol/g and should preferably be in the range of $10^{-2}$ to $10^{-4}$ mol/g.

The following products are given as specific examples of the bonding agents used in the present invention; VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, and MPR-TM manufactured by Nisshin Chemical Industry Co., Ltd., 1000W, DX80, DX81, DX82, and DX83 manufactured by Danki Kagaku Kogyo K.K., MR110, MR100, and 400X110A manufactured by Nippon Zeon Co., Ltd.; NIPPORAN N2301, N2302, and N2304 manufactured by Nippon Polyurethane Co., Ltd.; PANDEX T-5105, T-R3080, T-5201, BARNOCK D-400, D-210-80, CRISVON 6109, and 7209 manufactured by Dainippon Ink & Chemicals, Inc.; VYLON UR8200, UR8300, RV530, and RV280 manufactured by Toyobo Co., Ltd., DAIFERAMINE 4020, 5020, 5100, 5300, 9020, 9022, and 7020 manufactured by Dainichiseika Color & Chemicals Mfg. Co., Ltd.; MX5004 manufactured by Mitsubishi Chemical Industries, Ltd.,; SUNPLENE SP-150 manufactured by Sanyo Chemical Industry Co., Ltd.; and SARAN F310 and F210 manufactured by Asahi Chemical Industry Co., Ltd.

The bonding agent used in the upper magnetic layer according to the present invention is to be used in the range of 5 to 50 per cent by weight, and should preferably be used in the range of 10 to 30 per cent by weight, in its ratio to the ferromagnetic powder. In case any vinyl chloride resin is to be used, its ratio should be in the range of 5 to 30 per cent by weight, and, in case any polyurethane resin is to be used, its ratio should be in the range of 2 to 20 per cent by weight, and polyisocyanate should be used in the range of 2 to 20 per cent by weight. It is preferable to use these bonding agents in combination.

In case any polyurethane resin is to be used in the present invention, it is preferable that its glass transition temperature is in the range of $-50°$ to $100°$ C., that its fracture elongation is in the range of 100 to 2,000%, that its fracture stress is in the range of 0.05 to 10 kg/cm$^2$, and that its yield point is in the range of 0.05 to 10 kg.cm$^2$. The magnetic recording medium according to the present invention is composed of two layers. Accordingly, it is of course possible to make changes of such factors as the quantity of the bonding agent, the quantities of vinyl chloride resin, polyurethane resin, polyisocyanate resin, or other resins as contained in the bonding agent, the molecular weight of each resin constituting the magnetic layer, the quantity of the polar base, and the physical properties of the resins mentioned above in the lower layer and the upper magnetic layer as necessary.

As polyisocyanate used for the present invention, it is possible to use such isocyanate-based substances as trilene diisocyanate, 4-4'-diphenyl methane diiosycanate, hexamethylene diisocyanate, xylilene diisocyanate, naphthylene-1, 5-diisocyanate, o-tolui-diisocyanate, isoholon diisocyanate, and triphenylmethane triisocyanate, and products formed of any of these isocyanate-based substances and polyalochol, and polyisocyanate or the like formed by condensation of such an isocyanate-based substance. The tradenames of commercial products of such isocyanate-based substances include: CORONATE L, CORONATE HL, CORONATE 2030, CORONATE 2031, MILLIONATE MR, and MILLIONATE MTL manufactured by Nippon Polyurethane Co., Ltd.,; TAKENATE D-102, TAKENATE D-110N, TAKENATE D-200, and TAKENATE D-202 manufactured by Takeda Chemical Industries, Ltd.; DESMODUR L, DESMODUR IL, DESMODULR N, and DESMODUR HL manufactured by Sumitomo Bayer Co., Ltd. These products can be used either individually or in a combination of two or more for both the non-magnetic undercoat layer and the upper magnetic layer.

The carbon black used in the upper magnetic layer according to the present invention may be furnace carbon black for rubber, thermal carbon black for rubber, black for color, acetylene black, and the like. It is preferable that the carbon black have a specific surface area in the range of 5 to 500 m$^2$/g, a DBP oil absorption amount in the range of 10 to 400 ml/100 g, a particle size in the range of 5 m$\mu$m to 300 m$\mu$m, a pH value in the range of 2 to 10, a moisture content ratio in the range of 0.1 to 10%, and a tap density in the range of 0.1 to 1 g/cc. Specific examples of the carbon black which can be used for the present invention may be listed as follows: BLACKPEARLS 2000, 1300, 1000, 900, 800, 700, and VULCAN XC-72 manufactured by Cabot & Co., Ltd., #80, #60, #55, #50, and #35 manufactured by Asahi Carbon Co., Ltd.; #2400B, #2300, #900, #1000, #30, #40, and #10B manufactured by Asahi Chemical Industry Co., Ltd.; CONDUCTEX SC, RAVEN 150, 50, 40, and 15 manufactured by Colombia Carbon Co., Ltd. Carbon black may be used with surface treatment with a dispersant or the like, used as grafted with resin, or used with a part of its surface turned into graphite. Moreover, carbon black may be dispersed in advance with a bonding agent before it is added to a magnetic film. These carbon black products may be used either individually or in combination. In case carbon black is used, it is desirable to use it in a ratio ranging from 0.1 to 30% to the amount of the ferromagnetic powder. Carbon black produces such effects as preventing a magnetic layer from being charged, reducing the coefficient of friction, producing a light-shielding effect, and improving the strength of a coating film, these effects will differ depending on the particular carbon black product used. Therefore, these carbon black products which can be used for the present invention can of course be used in various ways to suit the particular purpose on the basis of the various characteristics, such as particle size, oil absorption amount, electroconductivity, and pH, which have already been mentioned above, by varying the types, quantities, and combinations of such carbon black products for their use in the above-mentioned non-magnetic undercoat layer and the above-mentioned upper magnetic layer. For example, carbon black having high conductivity can be used in the lower layer for preventing the charging of the layer therewith while carbon black in a large particle size can be used in the upper magnetic layer for thereby reducing its coefficient of friction. The carbon black which can be used in the upper magnetic layer according to the present invention can be found with reference, for example, to *Kabon Burakku Binran* (Carbon Black Handbook) compiled by Carbon Black Association of Japan.

The abrasive agents which can be used on the upper magnetic layer according to the present invention are such well-known materials mostly having a value not less than 6 on the Moh's scale of hardness as $\alpha$-alumina having an $\alpha$-transformation ratio not any less than 90%, β-alumina, silicon carbide, titanium oxide, chrome oxide, cerium oxide, α-iron oxide, corundum, artificial diamond, silicon nitride, silicon carbide titanium carbide, titanium oxide, silicon dioxide, and boron nitride, and these may be used either individually or in combination. Moreover, these abrasive agents may be used in the form of their composite substance made of two abrasive agents (i.e., an abrasive agent prepared by its surface treatment with another abrasive agent). These abrasive agents may contain a compound or elements other than the principal constituent in some cases, but their effect will remain unchanged, provided that the principal constituent is 90% or more of the composition. These abrasive agents should preferably be in the range of 0.01 to 2 μm, and yet it will also be possible to combine abrasive agents having different particle sizes, depending on the necessity, or to achieve a similar effect with a single abrasive agent by broadening its particle size distribution range. These abrasive agents should preferably have a tap density in the range of 0.3 to 2 g/cc, a moisture content ratio in the range of 0.1 to 5%, a pH value in the range of 2 to 11, and a specific surface area in the range of 1 to 30 m²/g. The shape of an abrasive agent used for the present invention may be any of a needle form, a spherical form, or a cubic form, and yet a shape which has an edge in some part of its offers higher abrasive property and is therefore more preferable.

As specific examples of the abrasive agents which can be used for the present invention, the following products are known: AKP-20, AKP-30, AKP-50, and HIT-50 manufactured by Sumitomo Chemical Co., Ltd.; G5, G7, and S-1 manufactured by the Nippon Chemical Industrial Co., Ltd.; 100ED and 140ED manufactured by Toda Industrial Co., Ltd. The abrasive agents which are used for the present invention may of course be used in a manner suitable for the particular purpose by varying their types, quantities, and combinations for their use in the lower non-magnetic layer and the upper magnetic layer. These abrasive agents may be given a dispersing treatment with a bonding agent in advance before it is added to a magnetic paint. The abrasive agent placed on the surface of the upper magnetic layer and the end areas of the upper magnetic layer of the magnetic recording medium according to the present invention should preferably be not less than 5 pieces/100 μm².

For additives for the present invention, those additives which have a lubricating effect, a charge preventing effect, a dispersant effect, a plasticizing effect, and so forth are to be used. Molybdenum disulfide, tungsten sulfide graphite, boron nitride, graphite fluoride, silicone oil, silicone having a polar base, fatty acid denatured silicone, silicone containing fluorine, alcohol containing fluorine, ester containing fluorine, polyolefin, polyglycol, alkyl phosphate and its alkali metallic salt, alkyul sulfate and its alkali metallic salt, polypheyl ether, alkyl sulfate containing fluorine and its alkali metallic salt, monobasic fatty acid with a carbon number ranging from 10 to 24 (this may contain unsaturated bond or may be branched), and metallic salt of these (Li, Na, K, Cu, etc.), or monovalent, bivalent, trivalent, quadrivalent, pentavalent, and hexavalent alcohol with a carbon number ranging from 12 to 22 (which may include an unsaturated bond or may be branched), monobasic fatty acid ester or di-fatty acid ester or tri-fatty acid ester composed of alkoxy alcohol with a carbon number ranging from 12 to 22, and monobasic fatty acid with a carbon number ranging from 10 to 24 (which may include an unsaturated bond or may be branched) and any one of monovalent, bivalent, trivalent, quandrivalent, pentavalent, and hexavalent alcohol having a carbon number in the range of 2 and 12 (which may contain an unsaturated bond or may be branched), fatty acid ester of monoalkyl ether of alkylene oxide compound, fatty acid amide with a carbon number in the range of 8 to 22, and fatty amine with a carbon number in the range of 8 to 22 can be used. More specifically, the following examples are given: lauric acid, myristic acid, palmitic acid, stearic acid, behenic acid, stearic acid butyl, oleic acid, linolic acid, linolenic acid, elaidic acid, stearic acid octyl, stearic acid amyl, stearic acid isooctyl, myristic acid octyl, stearic acid butoxy ethyl, anhydrosolbian distearate, anhydrosolubitan trietearate, oleyl alcohol, lauryl alcohol, and the like.

Moreover, such nonionic surface active agents of the alkylene oxide group, the glyceric group, the glycidol group, and alkylphenol ethylene oxide adduct, such cationic surface active agents as cyclic amine, ester amide, quarternary ammonium salt, hydantoin derivative, and heterocyclic compounds, phosphonium or sulfonium, anionic surface active agents containing an acid group such as carboxylic acid, sulfonic acid, phosphoric acid, sulfate group, phosphate group, and such amphoteric surface active agents as amino acid, amino sulfonic acid, esters of sulfuric acid or phosphoric acid of amino alcohol, and alkylbetaine type, and the like can be used. These surface active agents are described in detail in *Kaimen Kasseizai Binran* (Handbook of Surface Active Agents) published by Sangyotosho Kabushiki Kaisha. These surface active agents and charge preventing agents are not necessarily 100% pure, and may contain such impurities as isomers, yet nonreacting substances, secondary reactants, decomposed substances, and oxidized substances in addition to their principal components, but such impurities should preferably be 30% or less and should more preferably be 10% or less.

These lubricants and surface active agents which are used for the present invention can be used in a variety of types and in various amounts as necessary in the lower non-magnetic layer and in the upper magnetic layer. For example, it is conceivable that fatty acids having different melting points can be used for the lower non-magnetic layer and for the upper magnetic layer, respectively, for controlling the oozing of the substance to the surface, that esters having different boiling points or polarities can be used for controlling the oozing of the substance to the surface, that the amount of the surface active agent is regulated to improve the stability of the coating, and that the amount of the addition of the lubricant is increased for the lower non-magnetic layer thereby to achieve an improvement on the lubricating effect. Such modifications are, of course, not to be limited to the examples given herein.

Also, all or some of the additives which are used for the present invention may be added in any work process in the manufacture of the magnetic paint. For example, there are cases in which such additives are mixed with the ferromagnetic powder before the kneading process, cases in which such additives are added in the kneading process which is performed with ferromagnetic powder, a bonding agent, and a solvent, cases in which such additives are added in the dispersing process, and cases in which such additives are added immediately before a coating operation. Examples of products for these lubricants used for the present invention may be given as follows: NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, Caster Oil Hardened Fatty Acid, NAA-42, NAA-44, CATION SA, CATION MA, CATION AB, CATION BB, NYMEEN L-201, NYMEEN L-202, NYMEEN S-202, NONION E-208, NONION P-208, NONION S-207, NONION K-204, NONION NS-202, NONION NS-210, NONIN NS-206, NONION L-2, NONION S-2, NONION S-4, NONION O-2, NONION LP-20R, NONION PP-40R, NONION SP-60R, NONION OP-80R, NONION OP-85R, NONION LT-221, NONION ST-221, NONION OT-221, NONOGURI MB, NONION DS-60, ANON BF, ANON LG, BUTYL STEARATE, BUTYL LAURATE, and ELCIC ACID manufactured by Nippon Oils & Fats Co., Ltd.; Oleic Acid manufactured by Kanto Chemical Co., Ltd.; FAL-205 and FAL-123 manufactured by Takemoto Fats & Oils Co., Ltd.; ENUJERUBU LO, ENUJORUBU IPM, and SANSO-SYZER E4030 manufactured by Shin-Nihon Kika-sha; TA-3, KF-96, KF-96L, KF-96H, KF 410, KF 420, KF 965, KF 54, KF, 50, KF 56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 manufactured by the Shin-Etsu Chemical Co., Ltd.; ARMID P and ARMID C, and ARMOSLIP CP manufactured by Lion-Ahmer Co., Ltd.; DUOMIN TDO manufactured by the Lion Fat & Oil Co., Ltd.; BA-41G manufactured by the Nisshin Oil Mills, Ltd.; and PROFAN 2012E, NEWPOLE PE61, IONET MS-400, IONET MO-200, IONET DL-200, IONET DS-300, IONET DS-1000, and IONET DO-200 manufactured by Sanyo Chemical Industry Co., Ltd.

An example of the organic solvents which can be used for the present invention are given below: ketones, such as acetone, methyl ethyl ketone, methyl isobutyl ketone, diisobutyl ketone, cyclohexanone, isophorone, and tetrahydrofuran; alcohols; such as methanol, ethanol, propanol, butanol, isobutyl alcohol, isopropyl alcohol, and methyl cyclohexanol; esters, such as methyl acetate, butyl acetate, isobutyl acetate, isopropyl acetate, ethyl lactate, and glycol acetate; glycol ethers, such as glycol dimethyl ether, glycol monothyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylene chlorhydrin, and dichlorobenzene; N, N-dimethyl formamide and hexane. These solvents may be used in an arbitrarily determined ratio. These organic solvents are not necessarily 100% pure, and may include such impure components as isomers, yet nonreacting substances, secondary reactants, decomposed substances, oxides, and moisture content. It is desirable that these impurities are 30% or less and more preferably 10% or less. The organic solvents which are used for the present invention may be used in a variety of types and in various amounts as necessary for the upper magnetic layer and the lower non-magnetic layer. Examples for such variations are: a solvent having high volatility is used in the non-magnetic layer to improve the surface property of the layer; a solvent having a high surface tension (such as cyclohexanone and dioxane) is used in the upper magnetic layer to increase the stability of the coating; and a solvent having a high parameter for the dissolubility of the upper magnetic layer is used to improve the degree of packing. However, it goes without saying that the variations in the use of these solvents for the present invention should not be limited to these examples.

In the construction of the magnetic recording medium according to the present invention, the non-magnetic supporting base has a thickness in the range of 1 to 100 $\mu$m and preferably in the range of 6 to 20 $\mu$m, the lower non-magnetic layer has a dry thickness in the range of 0.5 to 10 $\mu$m and preferably in the range of 1 to 5 $\mu$m, and the upper magnetic layer has a dry thickness in the range of 0.05 to 1.0 $\mu$m, preferably in the range of at least 0.05 $\mu$m to 0.6 $\mu$m and more preferably in the range of at least 0.05 $\mu$m to 0.3 $\mu$m. The total dry thickness of the upper magnetic layer and the lower non-magnetic layer is to be used within the range of 1/100 to 2 times the thickness of the non-magnetic supporting base. Moreover, an undercoat layer may be formed between the non-magnetic supporting base and the lower non-magnetic layer for the purpose of improving the close contact property between them. The thickness of this undercoat layer is in the range of 0.01 to 2 $\mu$m and preferably in the range of 0.05 to 0.5 $\mu$m. Additionally, a back coat layer may be formed on the non-magnetic supporting base at the side opposite to the magnetic layer side. The thickness of such a back coat layer is in the range of 0.1 to 2 $\mu$m and preferably in the range of 0.3 to 1.0 $\mu$m. For the undercoat layer and the back coat layer, such well-known layers can be used.

For the non-magnetic supporting base which is used for the present invention, a well-known film made of polyesters, such as polyethylene terephtalate, polyethylene naphthalate, polyolefins, cellulose triacetate, polycarbonate, polyamide, polyimide, polyamideimide, polisulfone, aramid, aromatic polyamide, or the like may be used. Such a supporting base may be processed in advance with a corona discharge treatment, a plasma treatment, a easy adhesion treatment, a heat treatment, a dust-preventing treatment, and so forth. In order to accomplish the purpose of the present invention, it is necessary to use a non-magnetic supporting base with a central line mean surface roughness (Ra) of 0.03 $\mu$m or less, preferably of 0.02 $\mu$m or less, and more preferably of 0.01 $\mu$m or less. Also, it is preferable that such a non-magnetic supporting base not merely has such a small central line mean surface roughness, but also does not have any rough protrusions per se as large as 1 $\mu$m or more. Also, the configuration of the surface can be freely controlled by the size and amount of the filler added to the supporting base. As examples of this filler, acrylic organic fine powder, as well as oxides of Ca, Si, Ti, and the like, and carbonate, may be given. The F-5 value in the tape transport direction for the non-magnetic supporting base used for the present invention should preferably be in the range of 5 to 50 kg/mm$^2$, and the F-5 value in the longitudinal direction of the tape should preferably be in the range of 3 to 30 kg/mm$^2$. It is thus usual that the F-5 value in the longitudinal direction of the tape is higher than the F-5 value in the tape width direction. Yet, this value does not have to be maintained in case it is particularly necessary to increase the strength of the supporting base in the direction of its width.

Moreover, the thermal shrinkage ratio in the tape transport direction and width direction of the non-magnetic supporting base should preferably by 3% or less and more preferably 1.5% or less at 100° C. in 30 minutes, and the shrinkage ratio at 80° C. in 30 minutes should preferably be 1% or less and more preferably 0.5% or less. The strength of the supporting base against its fracture should preferably be in the range of 5 to 100 kg/mm$^2$ in the both directions, and its modulus of elasticity should preferably be in the range of 100 to 2,000 kg/mm$^2$.

The processes for manufacturing the magnetic coating liquid according to the present invention comprises at least a kneading process, or dispersing process, and besides, mixing processes set up as necessary before and after these processes. The each process maybe respectively divided into two or more stages. All the raw materials, such as ferromagnetic powder, bonding agent, carbon black, abrasive, antistatic agent, lubricant, and solvent, which are used for the present invention may be added in the beginning or in the middle of any processes. Moreover, any raw materials may be added in divided portions in two or more processes. For example, polyurethane may be added in divided portions in the kneading process, the dispersing process and thereafter in the mixing process for the poupose of adjusting the viscosity thereof.

In order to attain the objects of the present invention, any conventional well-known manufacturing technique may of course be used as a part of the processes, and it is also possible to obtain a high $B_r$ in the magnetic recording medium according to the present invention by employing a continuous multi-stage kneader or a high pressurized kneader bearing strong kneading power. In case such a powerful kneader is employed, the ferromagnetic powder and all or a part of the bonding agent (provided, however, that a ratio not less than 30% of all the bonding agent is preferable) are processed for kneading in the range of 15 to 500 parts to 100 parts of the ferromagnetic powder. Detailed descriptions of these kneading processes are presented, for example, in Japanese Patent Application No. Sho. 62-264722 and Japanese Patent Application No. Sho. 62-236872.

Furthermore, the present invention can attain higher efficiency in the manufacture of the magnetic recording medium by employing a simultaneous dual-layer coating process as shown in the embodiment given above. The construction described below can be proposed as an example of an apparatus and a method for making a magnetic recording medium formed in dual layers as defined in the present invention.

1. First, a low non-magnetic layer is coated by means of a gravure coating machine, a roll coating machine, a blade coating machine, an extrusion coating machine, or the like, which is generally used for the application of magnetic layer, and then an upper magnetic layer is coated by means of a extrusion type coating machine without backing roll for fearing the supporting base of the type disclosed, for example, in Japanese Patent No. Hei. 1-46186, Japanese Laid-Open Patent Application No. Sho. 60-238179, and Japanese Lain-Open Patent Application No. Hei. 2-265672, when the lower nonmagnetic layer still remains in its wet state.

2. Both the upper and lower layers are coated almost at the same time by means of a single coating head unit with two coating liquid passage slots as disclosed, for example, in Japanese Laid-Open Patent Application No. Sho. 63-88080, Japanese Laid-Open Patent Application No. Hei. 2-17921, and Japanese Laid-Open Patent Application No. Hei. 2-265672.

3. Both the upper and lower layers also are coated almost at the same time by means of an extrusion coating machine provided with a backing roll which is disclosed, for example, in Japanese Laid-Open Patent Application No. Hei. 2-174965.

Moreover, it is desirable to apply a shearing force to the coating liquid in the inside of a coating head by a process which is closed, for example, in Japanese Laid-Open Patent Application No. Sho. 62-95174 and Japanese Patent Application No. Hei. 1-236968 in order to prevent the electromagnetic conversion characteristics of the magnetic recording medium from degrading due to the aggregation of the ferromagnetic powder. Moreover, it is preferable that the viscosity of the magnetic thin layer is satisfied with the range of numerical values disclosed in Japanese Laid-Open Patent Application No. Hei. 3-8471.

Moreover, the present invention requires powerful orientation. It is preferable to use solenoids each rated 1,000 G or more in capacity and cobalt magnets each rated 2,000 G or more in combination. It is also preferable to employ an appropriate drying process performed in advance of orientation, so that the orientation after the drying process will be at the highest level achievable.

Furthermore, a plastic roll made of heat resistant material, such as epoxy, polyimide, polyamide, and polyimideamide is to be used as a calendering roll, with which a process for smoothing the surface of the magnetic recording medium mentioned above is to be performed. Also, this process may be performed with metal rolls used together. The calendering temperature should preferably be 70° C. or higher, and more preferably 80° C. or higher. The line pressure at the rip point between each of rolls should preferably be 200 kg/cm, and more preferably 300 kg/cm or higher, and the calendering speed should be within the range of 20 m/min to 700 m/min.

The coefficient of friction of the upper magnetic layer and the SUS 420J stainless steel head (JIS: SUS420J) of a measuring instrument positioned on the surface opposite to the upper magnetic layer according to the present invention should preferably be 0.5 or less and more preferably 0.3 or less; their specific surface resistibility should preferably be in the range of $10^{-5}$ to $10^{-12}$ ohms/sq.; their modulus of elasticity at the 0.5% elongation of the upper magnetic layer should preferably be in the range of 100 to 2,000 kg/mm$^2$ both in the longitudinal direction and in the width direction thereof; their strength against fracture should preferably be in the range of 1 to 30 kg/cm$^2$; the modulus of elasticity of the magnetic recording medium should preferably be in the range of 100 to 1500 kg/mm$^2$ both in the longitudinal direction and in the longitudinal direction thereof; its residual elongation should preferably be 0.5% or less; its coefficient of thermal shrinkage should preferably be 1% or less, more preferably 0.5% or less, and most preferably 0.1% or less, at any temperature not any higher than 100° C.

The residual solvent contained in the upper magnetic layer mentioned above should preferably be 100 mg/m$^2$ or less and more preferably 10 mg/m$^2$ 10 mg/m$^2$ or less. It is preferable that the residual solvent contained in the upper magnetic layer mentioned above be less than that of the low non-magnetic layer mentioned above.

The void ratio which the above-mentioned upper magnetic layer and the above-mentioned lower nonmagnetic layer respectively should both be preferably 30% by volume or less, and more preferably 10% by volume or less. Although it is preferable that the void ratio of the upper magnetic layer be larger than that of the lower non-magnetic layer, there will be no impediment even if the void ratios of these layers are in a reversed relationship, so long as the void ratio of the lower non-magnetic layer is 20% or less.

The magnetic characteristics of the magnetic recording medium according to the present invention as measured in a magnetic field at 5 kOe should attain a rectangular ratio not any less than 0.70, and preferably not less than 0.80, and more preferably not less than 0.90, in terms of the rectangular ratio in the tape transport direction. The SFD of the magnetic layer should preferably be 0.6 or less.

As described above, the present invention discloses a method for manufacturing a magnetic recording medium comprised of a lower non-magnetic layer formed on a continually transported non-magnetic supporting base by coating a dispersoid liquid containing acicular, non-magnetic particles and an upper magnetic layer having a dry thickness of 1.0 $\mu$m or less formed on the lower non-magnetic layer in dual layered state by coating a magnetic coating liquid containing magnetic particles dispersed therein while the lower non-magnetic layer is still in a wet state.

According to one aspect of the invention, the magnetic recording medium manufacturing method is characterized in that the acicular, non-magnetic particles in the lower non-magnetic layer promote the orientation of the magnetic particles while the dual layers, still in their wet state, are exposed to a magnetic field.

In other words, with the non-magnetic particles in an acicular in the middle of, as well as before and after, the orientation with the magnetic field cause the magnetic particles in the magnetic layer to be in their stable state. Accordingly, the orientation of the magnetic particles in the magnetic layer mentioned above will not be disturbed.

In another aspect of the invention, the specific gravity of the non-magnetic particles is equal to or larger than that of the magnetic particles while the dual layers are exposed to the magnetic field in their undried states. Because the specific gravity of the non-magnetic particles is larger than that of the magnetic particles, the magnetic particles in the upper magnetic layer will not fall into an unstable state at any time the duel layers are in their undried states. Accordingly, the orientation of the magnetic particles in the upper magnetic layer mentioned above will not be disturbed.

In yet another aspect of the present invention, the method particles is not nay larger than that of the magnetic particles as taken along the long axis. Due to the limitation of the particle size of the non-magnetic particles, the magnetic particles in the upper magnetic layer remain in their stable states even after the duel layers are exposed to a magnetic field while still in their undried dual layer states. Accordingly, the orientation of the magnetic particles in the upper magnetic layer will not be disturbed.

As a result, the present invention can offer a magnetic recording medium manufacturing method which is capable of achieving a favorable orientation of the magnetic particles in the upper magnetic layer as thin as 1.0 $\mu$m or less in its dry thickness, thereby producing a magnetic recording medium with favorable electromagnetic conversion characteristics in terms of its output, S/N ratio, or the like.

EXAMPLES OF THE PREFERRED EMBODIMENTS OF THE INVENTION

In the subsequent part, specific examples of preferred embodiments of the present invention will be described with a view to presenting a clearer demonstration of the advantageous effects achieved by the present invention. The present invention is not to be limited in anyway to these examples.

Lower non-magnetic layer coating liquid:

A lower non-magnetic layer coating liquid having the following composition is constituents is kneaded with a continuous multi-stage kneader and is thereafter dispersed by means of a sand mill. Six parts by weight of polyisocyanate are then added tot he dispersoid liquid thus obtained, and also 40 parts by weight of butyl acetate are added to the liquid. Then, the liquid thus prepared is filtered by the use of a filer having an average hole diameter of 1 $\mu$m, and five kinds of lower non-magnetic layer coating liquid are prepared, provided, however, that $\alpha$-Fe$_2$O$_3$ (with a specific gravity of 5.12) is used in the mean particle size (the diameter along the long axis) of 0.27 and in the acicular ratio of 1 (sphere), 6, 8, 11, and 13, respectively, as the dispersed non-magnetic particles in each of the lower non-magnetic layer coating liquids mentioned above.

| Composition: | |
|---|---|
| Non-magnetic particles | 100 parts by weight |
| Copolymer of vinyl chloride, vinyl acetate, and vinyl alcohol containing 5 × 10$^{-6}$ eq/g of polar group of —N(CH$_3$)$_3$ +Cl$^-$ | 12 parts by weight |
| Composition ratios | 86:13:1 |
| Degree of polymerization | 400 |
| Polyester polyurethane resin Neopentyl glycol/caprolactone polyol/ MDI containing 1 × 10$^{-4}$ eq/g of —SO$_3$Na group | 5 parts by weight 0.9/2.6/1 |
| Butyl stearate | 1 part by weight |
| Stearic acid | 1 part by weight |
| Methyl ethyl ketone | 200 parts by weight |

Magnetic Layer Coating Liquid ($\alpha$)

An upper magnetic layer coating liquid ($\alpha$) in the composition of constituents mentioned below is kneaded by means of a continuous kneader and then dispersed by the use of a sand mill. The dispersoid liquid thus obtained is added with 3 parts by weight of polyisocyanate and added further with 40 parts by weight of butyl acetate and then filtered by means of a filer having a mean hole diameter of 1 $\mu$m, and the magnetic layer coating liquid ($\alpha$) has thus been prepared.

| Composition: | |
|---|---|
| Ferromagnetic metal powder (composition: Fe/Zn/Ni = 92/4/4) | 100 parts by weight |
| Specific gravity | 6.01 |
| Hc | 1600 Oe |
| Specific surface area by BET method | 60 m$^2$/g |
| Crystal size | 195 Å |
| Particle size (diameter along the long axis) | 0.15 $\mu$m |
| Acicular ratio | 10 |
| Vinylchloride copolymer containing 1 × 10$^{-4}$ eq/g of —SO$_3$Na group | 12 parts by weight |
| Degree of polymerization | 300 |
| Polyester polyurethane resin Neopentyl glycol/caprolactone polyol/MDI containing 1 × 10$^{-4}$ eq/g | 5 parts by weight 0.9/2.6/1 |

-continued

Composition:

| of —SO₃ Na group | |
|---|---|
| α-alumina (particle size: 0.3 μm) | 2 parts by weight |
| Carbon black (particle size: 0.10 μm) | 0.5 parts by weight |
| Butyl stearate | 1 part by weight |
| Stearic acid | 2 parts by weight |
| Methyl ethyl ketone | 200 parts by weight |

Magnetic Layer Coating Liquid (β)

An upper magnetic layer coating liquid (β) in the composition of constituents shown below is kneaded by means of a continuous kneader and thereafter dispersed by the use of a sand mill. The dispersoid liquid thus obtained is added with 3 parts by weight of polyisocyanate and further added with 40 parts by weight of butyl acetate and then filtered by the use of a filler having a mean hole diameter of 1 μm, and the magnetic layer coating liquid (β) is thus prepared.

Composition:

| Ferromagnetic powder (Co denatured γ-Fe₂O₃) | 100 parts by weight |
|---|---|
| Specific gravity | 5.03 |
| Hc | 950 Oe |
| Specific surface area by BET method | 56 m²/g |
| Crystal size | 250 Å |
| Particle size (as measured along long axis) | 0.23 μm |
| Acicular ratio | 8 |
| Vinylchloride copolymer containing 1 × 10⁻⁴ eq/g of —SO₃ Na group | 12 parts by weight |
| Degree of polymerization | 300 |
| Polyester polyurethane resin | 5 parts by weight |
| Neopentyl glycol/caprolactone polyol/MDI containing 1 × 10⁻⁴ eq/g of —SO₃ Na group | 0.9/2.6/1 |
| α-alumina (particle size: 0.3 μm) | 2 parts by weight |
| Carbon black (particle size: 0.10 μm) | 0.5 part by weight |
| Butyl stearate | 1 part by weight |
| Stearic acid | 2 parts by weight |
| Methyl ketone | 200 parts by weight |

EXAMPLE 1

The lower non-magnetic layer coating liquid (A) and the upper magnetic layer coating liquid (α) described above are simultaneously coated in dual layers on a supporting base made of polyethylene terephtalate having a thickness of 7 μm with a central line mean surface roughness of 0.01 μm by means of a simultaneous dual-layer coating apparatus as described above. However, the apparatus is designed to form the lower non-magnetic layer in a dry thickness of 2 μm and to form the upper magnetic layer in the dry thickness of 0.2 μm.

Next, an orienting process is performed on the magnetic particles with a magnetic field put into action with an opposed dual-coil cobalt magnet provided with a magnetic field intensity rated at 3,000 gauss (G) and a solenoid coil having a magnetic field intensity rated at 1,500 G while the duel layers are still in their wet state. Then, a drying process is applied to the dual layers, which are subsequently subjected to a calendering process at the temperature of 90° C. by means of a calendering machine constructed in seven stages comprised entirely of metal rolls and then slit to a desired size to make magnetic tape specimens.

Thereafter, the magnetic tape specimens thus produced are measured to determine their respective rectangular ratios, and the measured results are shown in Table 1 given below. The measurement of the rectangular ratios has been conducted at the magnetic field intensity of 5 kOe a vibrating specimen magnetic (VSM) power measuring instrument manufactured by Toei Kogyo K.K.

EXAMPLE 2

In this example, magnetic tape specimens are prepared under exactly the same conditions as in the Example 1, except for the use of the upper magnetic layer coating liquid (β) instead of the upper magnetic layer coating liquid (α) used in Example 1.

The rectangular ratios are measured individually of the magnetic tape specimens produced in the same manner as in Example 1, and the measured results are presented in Table 1 given below.

COMPARATIVE EXAMPLE 1

A lower non-magnetic layer is formed with the lower non-magnetic layer coating liquid (A) applied and dried so as to yield a dry thickness of 2 μm on a polyethylene terephtalate support ring base in the thickness of 7 μm and with a central lines mean surface roughness of 0.01 μm, and the above-mentioned upper magnetic layer coating liquid α is placed in the dry thickness of 0.2 μm on the lower non-magnetic layer.

While the upper magnetic layer coating liquid (α) is still in its wet state, an orienting process is performed on the magnetic particles with a magnetic field put into action by means of an opposed dual-pole cobalt magnet having a magnetic field intensity rated at 3,000 G and a solenoid coil having a magnetic field intensity rated at 1,500 G. The magnetic recording medium thus prepared is then dried and subjected to a calendering process at 90° C. with a calendering machine constructed in seven stages consisting of only metal rolls. The magnetic recording medium thus prepared is slit to a desired size and made into magnetic tape specimens.

The rectangular ratios of the magnetic tape specimens thus produced at individual measured, and the measured results are presented in Table 1.

COMPARATIVE EXAMPLE 2

In this comparative example, magnetic tape specimens are prepared under exactly the same conditions except that the upper magnetic layer coating liquid (β) is used here instead of the upper magnetic layer coating liquid (α), which is used in the comparative example 1 given above.

The rectangular ratios of the magnetic tape specimens which are produced in the same manner as in Example 1 given above are measured individually, and the measured results are shown in Table 1.

TABLE 1

| | Upper Magnetic Layer | | Lower Non-magnetic layer | | Rectangular ratio |
|---|---|---|---|---|---|
| Specimen No. | Ferromagnetic powder | Acicular ratio | Non-magnetic powder | Acicular ratio | |
| Example 1 | | | | | |
| 1 | Ferro- | 8 | α-Fe₂O₃ | 1 | 0.81 |
| 2 | magnetic | | | 6 | 0.83 |
| 3 | metal powder | | | 8 | 0.87 |
| 4 | (Fe/Zn/Ni = | | | 11 | 0.86 |
| 5 | 92/4/4) | | | 13 | 0.89 |
| Example 2 | | | | | |
| 6 | Co denatured | 10 | α-Fe₂O₃ | 1 | 0.84 |

TABLE 1-continued

| Specimen No. | Upper Magnetic Layer Ferromagnetic powder | Acicular ratio | Lower Non-magnetic layer Non-magnetic powder | Lower Non-magnetic layer Acicular ratio | Rectangular ratio |
|---|---|---|---|---|---|
| 7 | γ-Fe$_2$O$_3$ | | | 6 | 0.86 |
| 8 | | | | 8 | 0.90 |
| 9 | | | | 11 | 0.91 |
| 10 | | | | 13 | 0.91 |
| Comparative Example 1 | | | | | |
| 11 | Ferromagnetic metal powder (Fe/Zn/Ni = 92/4/4) | 8 | α-Fe$_2$O$_3$ | 1 | 0.76 |
| 12 | | | | 6 | 0.75 |
| 13 | | | | 8 | 0.76 |
| 14 | | | | 11 | 0.75 |
| 15 | | | | 13 | 0.76 |
| Comparative Example 2 | | | | | |
| 16 | Co denatured γ-Fe$_2$O$_3$ | 10 | α-Fe$_2$O$_3$ | 1 | 0.76 |
| 17 | | | | 6 | 0.77 |
| 18 | | | | 8 | 0.77 |
| 19 | | | | 11 | 0.78 |
| 20 | | | | 13 | 0.78 |

As it is clearly observed in light of the results shown in Table 1, the rectangular ratio declines progressively as the acicular ratio in the non-magnetic powder of the lower non-magnetic layer becomes smaller and as the particle shape of the non-magnetic particles becomes closer to a spherical shape. A favorable rectangular ratio, however, can be obtained where the acicular ratio of the non-magnetic powder is large and an orienting operation is performed while the duel layers, i.e., the lower non-magnetic layer and the upper magnetic layer mentioned above are still in their wet states.

EXAMPLES OF ANOTHER ASPECT OF THE INVENTION

Lower Non-magnetic layer Coating Liquid

The lower non-magnetic layer coating liquid has the same composition as that described for Examples 1 and 2 above, expect the individual lower non-magnetic layer coating liquids respectively use SnO$_2$, ZnO, TiO$_2$, Al$_2$O$_3$, and SO$_2$ with a mean particle size of 0.10 μm as the non-magnetic particles dispersed in them.

Magnetic Layer Coating Liquid (α)

The upper magnetic layer coating liquid (α) has the same composition as in Examples 1 and 2 above except $\sigma = 130$ emu/g

Upper Magnetic Layer Coating Liquid (β)

The magnetic layer coating liquid β has the same composition as that in Examples 1 and 2 above.

EXAMPLE 3

The lower non-magnetic layer coating liquid mentioned above and the upper magnetic layer coating liquid (α) mentioned above are simultaneously coated and subjected to the same processes in the same manner as in Example 1 above. The magnetic tape specimens thus produced are measured to determine their respective rectangular ratios, and the measured results are shown in Table 2 given below.

EXAMPLE 4

In this example, the magnetic tape specimens are prepared under the same conditions as in the Example 2 above with the aforementioned exceptions. The magnetic tape specimens produced are measured, and the measured results are presented in Table 2 given below.

COMPARATIVE EXAMPLE 3

A magnetic recording medium is prepared as in Comparative Example 1 above, and is out to a desired size and made into magnetic tape specimens. Then, the rectangular ratios of the magnetic tape specimens are individually measured, and the measured results are presented on Table 2 mentioned above.

COMPARATIVE EXAMPLE 4

In this comparative example, magnetic tape specimens are prepared under exactly the same conditions as in Comparative Example 2 with the foregoing exceptions. Then, the rectangular ratios of the magnetic tape specimens which are produced are measured individually, and the measured results are shown in Table 2 given below.

TABLE 2

| Specimen No. | Upper Magnetic Layer Ferromagnetic powder | Specific gravity | Lower Non-magnetic layer Non-magnetic powder | Specific gravity | Rectangular ratio |
|---|---|---|---|---|---|
| Example 3 | | | | | |
| 1 | Ferromagnetic metal powder (Fe/Zn/Ni = 92/4/4) | 6.01 | SnO$_2$ | 7.01 | 0.89 |
| 2 | | | ZnO | 5.80 | 0.85 |
| 3 | | | TiO$_2$ | 4.93 | 0.84 |
| 4 | | | Al$_2$O$_3$ | 4.03 | 0.80 |
| 5 | | | SiO$_2$ | 2.65 | 0.77 |
| Example 4 | | | | | |
| 6 | Co denatured γ-Fe$_2$O$_3$ | 5.03 | SnO$_2$ | 7.01 | 0.91 |
| 7 | | | ZnO | 5.60 | 0.89 |
| 8 | | | TiO$_2$ | 4.93 | 0.86 |
| 9 | | | Al$_2$O$_3$ | 4.03 | 0.83 |
| 10 | | | SiO$_2$ | 2.65 | 0.81 |
| Comparative Example 3 | | | | | |
| 11 | Ferromagnetic metal powder (Fe/Zn/Ni = 92/4/4) | 6.01 | SnO$_2$ | 7.01 | 0.76 |
| 12 | | | ZnO | 5.60 | 0.76 |
| 13 | | | TiO$_2$ | 4.93 | 0.75 |
| 14 | | | Al$_2$O$_3$ | 4.03 | 0.75 |
| 15 | | | SiO$_2$ | 2.65 | 0.75 |
| Comparative Example 4 | | | | | |
| 16 | Co denatured γ-Fe$_2$O$_3$ | 5.03 | SnO$_2$ | 7.01 | 0.79 |
| 17 | | | ZnO | 5.60 | 0.79 |
| 18 | | | TiO$_2$ | 4.93 | 0.78 |
| 19 | | | Al$_2$O$_3$ | 4.03 | 0.78 |
| 20 | | | SiO$_2$ | 2.65 | 0.78 |

As it is clearly observed in light of the results shown in Table 2, the rectangular ratio declines progressively as the specific gravity of the non-magnetic particles in the lower non-magnetic layer decreases below the specific gravity of the ferromagnetic powder in the upper magnetic layer, but a favorable rectangular ratio can be obtained in a case where the specific gravity of the non-magnetic powder is larger than that of the ferromagnetic powder and an orienting operation is performed on the magnetic particles while the duel layers are still in their wet states.

EXAMPLES OF YET ANOTHER ASPECT OF THE INVENTION

Non-magnetic Undercoat Layer Coating Liquid

The lower non-magnetic layer coating liquid has the same composition as that described for Examples 1 and 2 above expect the lower five non-magnetic layer coating liquids use $SnO_2$ (with a specific gravity of 7.01) in the mean particle size of 1, 0.2, 0.1, 0.05, and 0.02 μm, respectively, as the dispersed non-magnetic particles in each of the lower non-magnetic layer coating liquids mentioned above.

Lower Non-magnetic Layer Coating Liquid B

The non-magnetic particles which are dispersed in the lower non-magnetic layer coating liquid are made of $TiO_2$ (with the specific gravity of 4.93) in the mean particle size of 1, 0.2, 0.1, 0.05, and 0.02 μm but otherwise kept the same as the lower non-magnetic layer coating liquid (A) mentioned above, and five kinds of non-magnetic undercoat layer coating liquids are thus prepared.

Magnetic Layer Coating Liquid (α)

The upper magnetic layer coating liquid (α) has the same composition as in Examples 1 and 2 above.

Magnetic Layer Coating Liquid (β)

The upper magnetic layer coating liquid (β) has the same composition as that in Examples 1 and 2 above.

EXAMPLE 5

The lower non-magnetic layer coating liquid mentioned above and the upper magnetic layer coating liquid (α) mentioned above are simultaneously coated and subjected to the same processes in the same manner as in Example 1 above. The magnetic tape specimens thus produced are measured to determine their respective angular ratios, and the measured results are shown in Table 3 given below.

EXAMPLE 6

In this example, the magnetic tape specimens are prepared under the same conditions as in the Example 2 above with the aforementioned exceptions. The magnetic tape specimens produced are measured, and the measured results are presented in Table 3 given below.

EXAMPLE 7

In this example of embodiment, magnetic tape specimens are prepared under exactly the same conditions as in the Example 5 except for the use of the lower non-magnetic layer coating liquid (B) instead of the above-mentioned lower non-magnetic layer coating liquid (A) used in Example 1.

Then, the rectangular ratios of the magnetic tape specimens made under exactly the same conditions as in Example 1 are measured individually, and the measured results are shown in Table 3 given below.

EXAMPLE 8

In this example, magnetic tape specimens are prepared under exactly the same conditions as in Example 6 except for the use of the lower non-magnetic layer coating liquid (B) instead of the above-mentioned lower layer coating liquid (A) used in Example 2.

Then, the rectangular ratios of the above-mentioned magnetic tape specimens prepared in the same manner as in Example 1 given above are measured respectively, and the measured results are presented in Table 3 given below.

COMPARATIVE EXAMPLE 5

A magnetic recording medium is prepared as in Comparative Example 1 above, and is slit to a desired size and made into magnetic tape specimens. Then, the rectangular ratios of the magnetic tape specimens are individually measured, and the measured results are presented in Table 4.

COMPARATIVE EXAMPLE 6

In this comparative example, magnetic tape specimens are prepared under exactly the same conditions as in Comparative Example 2 with the foregoing exceptions. Then, the rectangular ratios of the magnetic tape specimens which are produced are measured individually, and the measured results are shown in Table 4 given below.

COMPARATIVE EXAMPLE 7

In this comparative example, magnetic tape specimens are produced under exactly the same conditions as in Comparative Example 5 except that the lower non-magnetic layer coating liquid (B) is used instead of the lower non-magnetic coating liquid (A). The results are shown below in Table 4.

COMPARATIVE EXAMPLE 8

In this comparative example, magnetic tape specimens are produced under exactly the same conditions except that the lower non-magnetic layer coating liquid (B) is used instead of the lower non-magnetic layer coating liquid (A), which is used in the Comparative Example 6 given above. The results re given below in Table 4.

TABLE 3

| Specimen No. | Upper Magnetic Layer | | Lower Non-magnetic layer | | Rectangular ratio |
|---|---|---|---|---|---|
| | Ferromagnetic metal powder | Longer axis particle size (μm) | Non-magnetic powder | Average particle size (μm) | |
| Example 5 | | | | | |
| 1 | Ferro- | 0.15 | $SnO_2$ | 1.0 | 0.81 |
| 2 | magnetic | | | 0.2 | 0.83 |
| 3 | powder | | | 0.1 | 0.89 |
| 4 | (Fe/Zn/Ni = | | | 0.05 | 0.91 |
| 5 | 92/4/4) | | | 0.02 | 0.91 |
| Example 6 | | | | | |
| 6 | Co denatured | 0.23 | $SnO_2$ | 1.0 | 0.84 |
| 7 | $\tau$-$Fe_2O_3$ | | | 0.2 | 0.90 |
| 8 | | | | 0.1 | 0.91 |
| 9 | | | | 0.05 | 0.93 |
| 10 | | | | 0.02 | 0.93 |
| Example 7 | | | | | |
| 11 | Ferro- | 0.15 | $TiO_2$ | 1.0 | 0.79 |
| 12 | magnetic | | | 0.2 | 0.80 |
| 13 | metal powder | | | 0.1 | 0.84 |
| 14 | (Fe/Zn/Ni = | | | 0.05 | 0.85 |
| 15 | 92/4/4) | | | 0.02 | 0.86 |
| Example 8 | | | | | |
| 16 | Co denatured | 0.23 | $TiO_2$ | 1.0 | 0.82 |
| 17 | $\gamma$-$Fe_2O_3$ | | | 0.2 | 0.83 |
| 18 | | | | 0.1 | 0.86 |
| 19 | | | | 0.05 | 0.88 |
| 20 | | | | 0.02 | 0.88 |

TABLE 4

| Specimen No. | Upper Magnetic Layer Ferromagnetic metal powder | Upper Magnetic Layer Long axis particle size (μm) | Lower Non-magnetic layer Non-magnetic powder | Lower Non-magnetic layer Average particle size (μm) | Rectangular ratio |
| --- | --- | --- | --- | --- | --- |
| Comparative Example 5 | | | | | |
| 21 | Ferromagnetic powder (Fe/Zn/Ni = 92/4/4) | 0.15 | $SnO_2$ | 1.0 | 0.75 |
| 22 | | | | 0.2 | 0.76 |
| 23 | | | | 0.1 | 0.76 |
| 24 | | | | 0.05 | 0.75 |
| 25 | | | | 0.02 | 0.76 |
| Comparative Example 6 | | | | | |
| 26 | Co denatured $\gamma$-$Fe_2O_3$ | 0.23 | $SnO_2$ | 1.0 | 0.77 |
| 27 | | | | 0.2 | 0.77 |
| 28 | | | | 0.1 | 0.78 |
| 29 | | | | 0.06 | 0.78 |
| 30 | | | | 0.02 | 0.78 |
| Comparative Example 7 | | | | | |
| 31 | Ferromagnetic metal powder (Fe/Zn/Ni = 92/4/4) | 0.15 | $TiO_2$ | 1.0 | 0.75 |
| 32 | | | | 0.2 | 0.75 |
| 33 | | | | 0.1 | 0.75 |
| 34 | | | | 0.05 | 0.76 |
| 35 | | | | 0.02 | 0.76 |
| Comparative Example 8 | | | | | |
| 36 | Co denatured $\gamma$-$Fe_2O_3$ | 0.23 | $TiO_2$ | 1.0 | 0.77 |
| 37 | | | | 0.2 | 0.77 |
| 38 | | | | 0.1 | 0.78 |
| 39 | | | | 0.05 | 0.78 |
| 40 | | | | 0.02 | 0.79 |

As it is clearly observed in light of the results shown in Table 3 and Table 4, the rectangular ratio declines progressively according to the particle size of the non-magnetic powder in the lower non-magnetic layer increases in excess of the long axis of the of the particle size of the ferromagnetic powder, but a favorable rectangular ratio can be obtained when the particle size of the above-mentioned lower non-magnetic powder is smaller than that of the above-mentioned ferromagnetic powder and also that an orienting operation is performed on the magnetic particles while the dual layers, namely, the above-mentioned lower non-magnetic layer and the above-mentioned upper magnetic layer are still in their wet state.

What is claimed is:

1. A magnetic recording medium manufacturing method for forming an upper magnetic layer on a web, the manufacturing method comprising the steps of:

forming a lower non-magnetic layer by applying a dispersoid liquid containing acicular, non-magnetic particles on said web;

applying magnetic coating liquid containing magnetic particles on said lower non-magnetic layer thus formed to form an upper magnetic layer while said lower non-magnetic layer is in a wet state; and exposing said web to a magnetic field while both said lower non-magnetic layer and said upper magnetic layer are in a wet state;

wherein the particle size of said non-magnetic particles is equal to or less than the long axis of said magnetic particles, and said acicular, non-magnetic particles in said lower non-magnetic layer promote the orientation of said magnetic particles in said upper magnetic layer.

2. The magnetic recording medium manufacturing method of claim 1, wherein said upper magnetic layer formed has a dry thickness of 1.0 μm or less.

3. The magnetic recording medium manufacturing method of claim 2, wherein said lower non-magnetic layer and said upper magnetic layer are coated at substantially the same time.

4. The magnetic recording medium manufacturing method of claim 1, wherein the particle size of said non-magnetic particle is equal to or less than the long axis of said magnetic particles, and wherein the specific gravity of said non-magnetic particles is not less than that of said magnetic particles.

5. A magnetic recording medium manufacturing method for forming a magnetic layer on a web, the manufacturing method comprising the steps of:

forming a lower non-magnetic layer by applying a dispersoid liquid containing non-magnetic particles on said web;

applying a magnetic coating liquid containing magnetic particles on said lower non-magnetic layer thus formed to form an upper magnetic layer while said lower non-magnetic layer is in a wet state; and exposing said web to a magnetic field while both said lower non-magnetic and said upper magnetic layers are in a wet state;

wherein the specific gravity of said non-magnetic particles is not less than that of said magnetic particles.

6. The magnetic recording medium manufacturing method of claim 5, wherein said upper magnetic layer formed has a dry thickness of 1.0 μm or less.

7. The magnetic recording medium manufacturing method of claim 6, wherein said lower non-magnetic layer and said upper magnetic layer are coated at substantially the same time.

* * * * *